US008856414B2

(12) United States Patent
Lynn

(10) Patent No.: US 8,856,414 B2
(45) Date of Patent: Oct. 7, 2014

(54) DETERMINING REQUIRED SOFTWARE COMPONENTS FOR SCSI SYSTEM INITIALIZATION

(75) Inventor: James A. Lynn, Rose Hill, KS (US)

(73) Assignee: LSI Corporation, San Jose, CA (US)

( * ) Notice: Subject to any disclaimer, the term of this patent is extended or adjusted under 35 U.S.C. 154(b) by 952 days.

(21) Appl. No.: 12/455,550

(22) Filed: Jun. 3, 2009

(65) Prior Publication Data

US 2010/0313195 A1   Dec. 9, 2010

(51) Int. Cl.
G06F 13/10 (2006.01)
G06F 9/445 (2006.01)

(52) U.S. Cl.
CPC .................... G06F 9/44521 (2013.01)
USPC ............. 710/105; 710/11; 710/306; 710/311; 710/314

(58) Field of Classification Search
USPC ......................................... 717/174
See application file for complete search history.

(56) References Cited

U.S. PATENT DOCUMENTS

2006/0004935 A1* 1/2006 Seto et al. ........................ 710/62
2006/0288165 A1* 12/2006 Rosenbloom et al. ........ 711/115
2008/0003845 A1* 1/2008 Hong et al. ..................... 439/67

* cited by examiner

*Primary Examiner* — Don Wong
*Assistant Examiner* — Deric Ortiz
(74) *Attorney, Agent, or Firm* — Suiter Swantz pc llo

(57) ABSTRACT

A method is included for loading a main loadable file and at least one optional loadable file during initialization of a computer system. The method includes loading a main loadable file which includes a resident portion and an input/output network interface software component. The resident portion is a utilization software component configured to use transmission protocols. The method also includes determining which optional loadable files are required to be loaded. The optional loadable files each include an optional portion. The method also includes loading the optional loadable files which contain optional portions corresponding to required protocols.

20 Claims, 3 Drawing Sheets

DETERMINING REQUIRED SOFTWARE COMPONENTS FOR SCSI SYSTEM INITIALIZATION

TECHNICAL FIELD

The present disclosure generally relates to the field of computer system initialization, and more particularly to a system, method, and product for selectively installing software components in an electronic device.

BACKGROUND

Many electronic devices perform an initialization sequence upon being powered on which includes loading of software. This software may include the main operating system for the electronic device and the software components required for the processing and transfer of data by the various hardware contained within the electronic devices.

SUMMARY

A method includes loading a first managing software component for a first data transmission protocol and a first portion of a first utilization software component for the first data transmission protocol on a computer system. The method also includes verifying the inclusion of the first managing software component for the first data transmission protocol. The method further includes loading a second managing software component for a second data transmission protocol and a first portion of a second utilization software component for the second data transmission protocol. The method additionally includes verifying the inclusion of the second managing software component for the second data transmission protocol. The method also includes identifying a usable protocol combination including at least the first data transmission protocol and the second data transmission protocol. The method further includes loading a second portion of the first utilization software component and a second portion of the second utilization software component upon identifying the usable protocol combination including at least the first data transmission protocol and the second data transmission protocol.

An information handling device includes a memory, a processor, and a bus. The memory is configured for storing information. The processor is configured for loading a first managing software component, a first portion of a first utilization software component for a first protocol for determining the format and transmission of data, a second managing software component, and a first portion of a second utilization software component for a second protocol for determining the format and transmission of data into the memory. The bus is communicatively coupled to the processor and the memory. The processor determines the availability of the first protocol by verifying the inclusion of the first managing software component for the first protocol. The processor further determines the availability of the second protocol by verifying the inclusion of the second managing software component for the second protocol. The processor also identifies a useable protocol combination including at least the first protocol and the second protocol. The processor loads a second portion of the first utilization software component and a second portion of the second utilization software component upon identification of the useable protocol combination including at least the first protocol and the second protocol.

A further method is included for loading a main loadable file and at least one optional loadable file during initialization of a computer system. The method includes loading the main loadable file. The main loadable file includes at least one resident portion and an input/output network interface software component. The resident portion comprises a utilization software component configured to use at least one particular protocol. The method also includes reporting, by manager software components configured to manage at least one particular protocol, the protocols which manager software components manage. The method also includes determining which protocols are available based upon the protocols reported by the manager software components and based upon hardware devices installed in the computer system. The method further includes identifying usable protocol combinations. The method also includes determining, for each resident portion of the main loadable file, which protocols are required. A particular protocol is determined to be required if the particular protocol is a part of one or more usable protocol combinations for which all of the protocols of the usable protocol combination are determined to be available. The method additionally includes identifying one or more optional loadable files. Each identified optional loadable file contains a particular optional portion which corresponds to a particular protocol determined to be required. Further, the method includes loading each identified optional loadable file upon identifying one or more optional loadable files.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
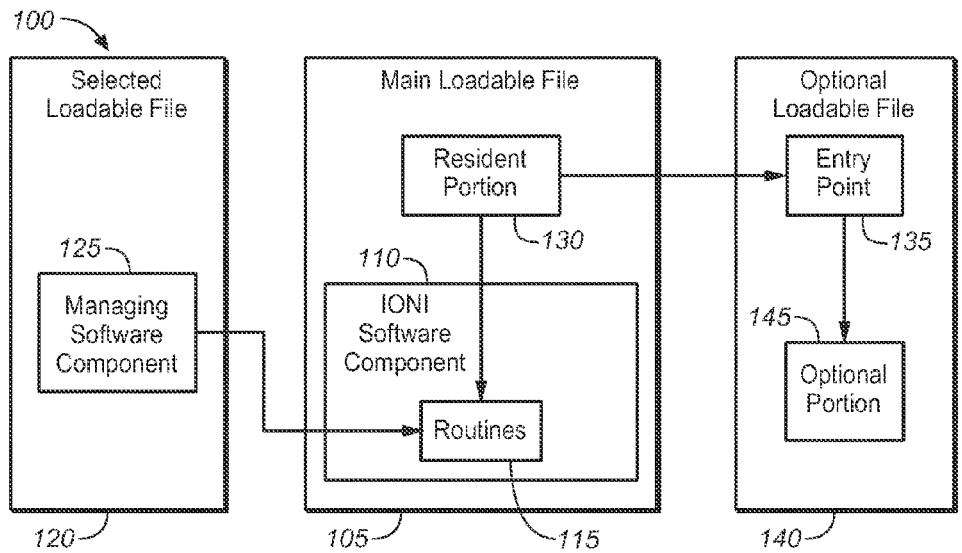
FIG. 1 is a block diagram of an initialization sequence of a system in accordance with an embodiment of the present disclosure.

Reference will now be made in detail to the subject matter disclosed, which is illustrated in the accompanying drawings.

Referring generally to FIGS. 1-5, an implementation of the initialization of a computer system in accordance with an exemplary embodiment of the present invention is shown. Implementation 100 may utilize Small Computer System Interface (SCSI) for Input/Output (I/O) processing. Implementation 100 may include main loadable file 105. Main loadable file 105 may be required to be loaded and executed upon startup. Main loadable file 105 may comprise a boot file or be contained within a boot file. Main loadable file 105 may contain Input/Output Network Interface (IONI) software component 110. IONI software component 110 may include routines 115 to provide interfaces for interaction with IONI software component 110.

Implementation 100 may further include selected loadable file 120. Selected loadable file 120 may include managing software component 125. Managing software component 125 may manage a protocol for determining the format and transmission of data on a computer system. Further, selected loadable file 120 may be loaded if managing software component 125 is included during compile-time of implementation 100. Selected loadable file 120 may be loaded into memory 520. Managing software component 125 may report its inclusion in implementation 100 to IONI software component 110. Managing software component 125 may utilize one of routines 115 to report the inclusion of its protocol.

In additional embodiments, any protocol (251-262) for determining the format and transmission of data on a computer system (e.g., a data transmission protocol) may be categorized as one of a SCSI Transport Protocol (STP), an Intermediate Transport Protocol (ITP), or a Media Transport Protocol (MTP). A STP may be defined by the Small Computer System Interface (SCSI) Architecture Model. Some examples of STPs may include, but are not limited to, Fibre Channel Protocol (FTP), Serial Attached SCSI (SAS), iSCSI, and SCSI RDMA Protocol (SRP). A MTP may be defined as protocols directly dependent upon the hardware in a system. A MTP may be further defined as the transport media which interface cards in a computer system utilize to transport SCSI Input/Outputs (I/Os). These interface cards may be replaceable. Specific portions of hardware in a system may be excluded from the system configuration undergoing initialization. Some examples of MTPs may include, but are not limited to, iSCSI-accelerated Ethernet Network Interface Controller (iSCSI NIC), RDMA-enabled Ethernet Network Interface Controller (RDMA NIC), Infiniband (IB), Serial Attached SCSI (SAS), Fibre Channel (FC), and Fiber Channel over Ethernet Network Interface Controller (FCOE NIC). An ITP may be defined as protocols not defined by the SCSI Architecture Model and also not directly dependent upon the hardware in a system, but required for some transmission of data. Some examples of ITPs may include, but are not limited to, Remote DMA Protocol (RDMA), iSCSI Extensions for RDMA (iSER), and IP over Infiniband (IPoIB).

IONI software component 110 may identify the hardware devices installed in the computer system configuration of implementation 100. The identification performed by IONI software component 110 may occur upon instantiation of IONI software component 110. Further, IONI software component 110 may identify the availability of protocols (e.g., the MTPs) implemented by the hardware devices installed in the computer system configuration of implementation 100.

Main loadable file 105 may contain a resident portion 130 of a utilization software component. Resident portion 130 may be resident within main loadable file 105. Resident portion 130 may be instantiated 310. A utilization software component may use a protocol for determining the format and transmission of data on a computer system. Resident portion 130 of a utilization software component may utilize one of routines 115 to query IONI software component 110 for determining whether the protocol it uses is required. IONI software component 110 may consult a table 525 of usable protocol combinations 205 to determine whether a protocol is required. Table 525 of usable protocol combinations 205 may be loaded into memory 520 by processor 510. A required protocol may be identified by being part of usable protocol combination 205 with all of the protocols 251-262 being available in the computer system configuration of implementation 100. As described above, IONI software component 110 may determine the availability of protocols (e.g., MTPs) through identification of hardware devices installed in the computer system configuration of implementation 100. IONI software component 110 may determine the availability of protocols 251-262 via managing software component 125 reporting the inclusion of its protocol.

Figure 2:
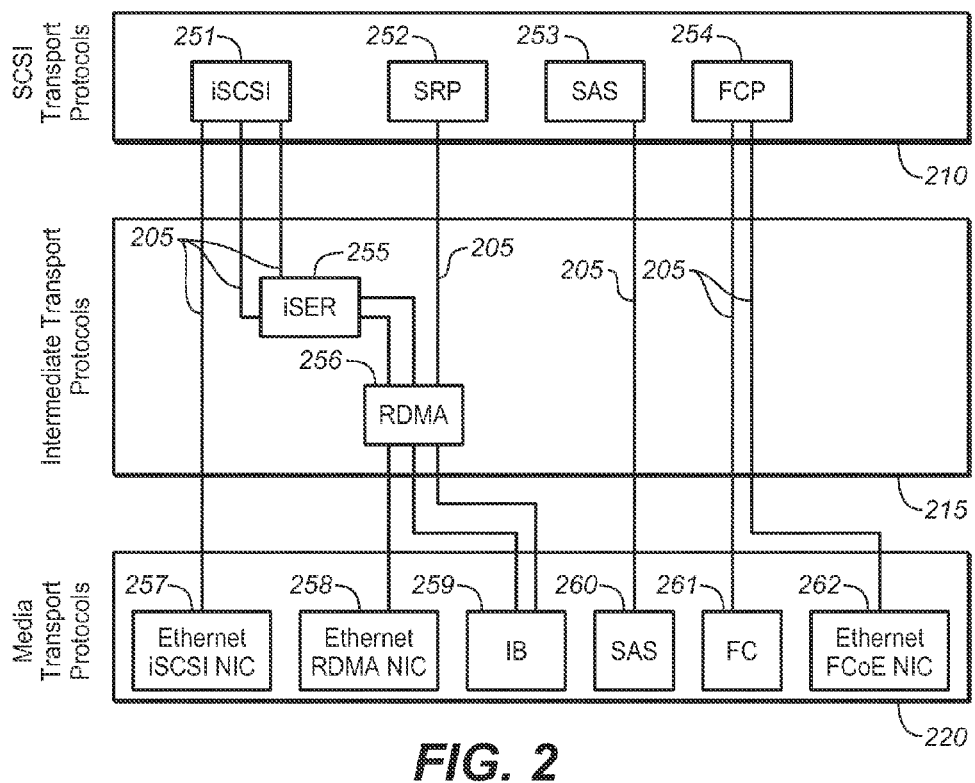
FIG. 2 is a block diagram of examples of usable categorized protocol combinations in accordance with an embodiment of the present disclosure.
Figure 3:
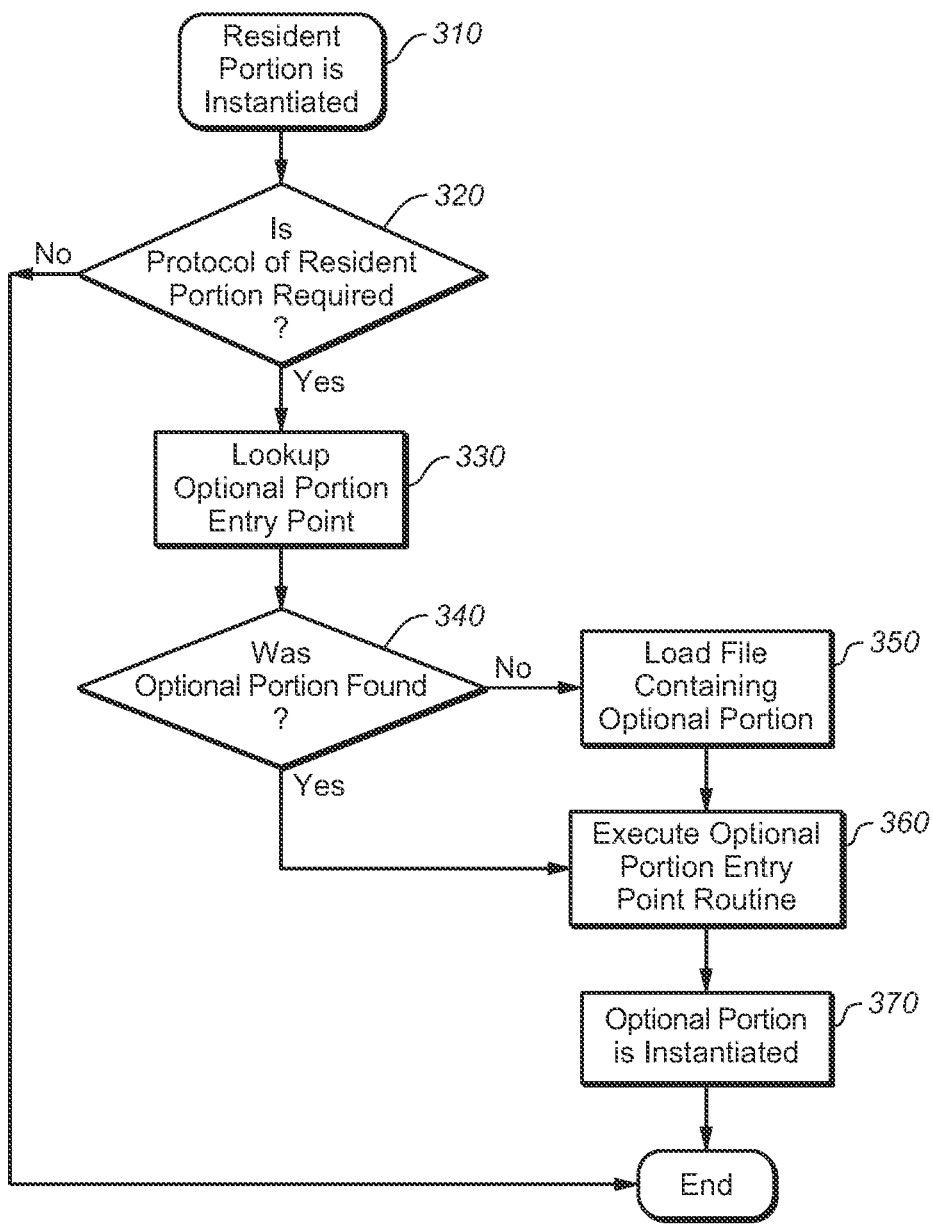
FIG. 3 is a flow chart illustrating a method for loading an optional portion of a software component during system initialization in accordance with an embodiment of the present disclosure.

In FIG. 2, a graphical representation of usable protocol combinations 205 is provided. Usable protocol combinations 205 may include protocols 251-262 from multiple protocol categories 210-220. Usable protocol combinations 205 may represent protocols that may be used in concert with each other in a computer system. For example, a usable protocol combination 205 may include STP-categorized protocol SAS 253 and MTP-categorized protocol SAS 260. In a further example, a usable protocol combination 205 may include STP-categorized protocol SRP 252, ITP-categorized protocol RDMA 256, and MTP-categorized protocol IB 259. In a further example, a usable protocol combination 205 may include STP-categorized protocol iSCSI 251, ITP-categorized protocol iSER 255, ITP-categorized protocol RDMA 256, and MTP-categorized protocol Ethernet RDMA NIC 258. Usable protocol combinations 205 may be entries in table 525. Table 525 of usable protocol combinations 205 may only include combinations for which all of its protocols are available. For example, if no SAS MTP is available, a usable protocol combination with SAS STP and SAS MTP may be removed from table 525, and SAS STP code would not have to be loaded.

Upon IONI software component 110 determining which protocol implemented via resident portion 130 is required 320, resident portion 130 may lookup entry point 135 of optional portion 145 corresponding to resident portion 130. Optional portion 145 may comprise software required to further implement the protocol associated with corresponding resident portion 130. Entry point 135 of optional portion 145 may be a block of code. Upon determining entry point 135 of optional portion 145 was not found 340, resident portion 130 may load optional loadable file 140 containing optional portion 350. Upon loading optional loadable file 140 containing optional portion, entry point 135 of optional portion 145 may be executed 360. Executing entry point 135 of optional portion 145 may instantiate optional portion 370. Processor 510 may execute the various software components or blocks of code in the present disclosure.

Figure 4:
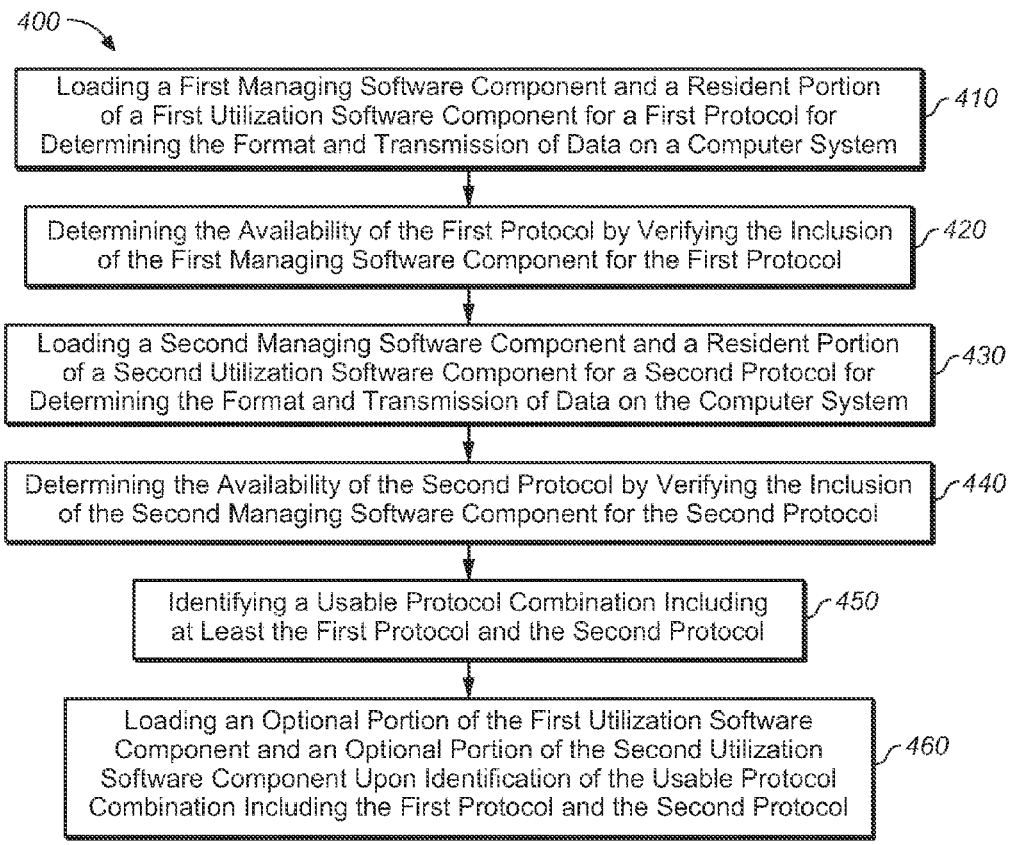
FIG. 4 is a flow chart illustrating a method for initialization of a computer system in accordance with an embodiment of the present disclosure
Figure 5:
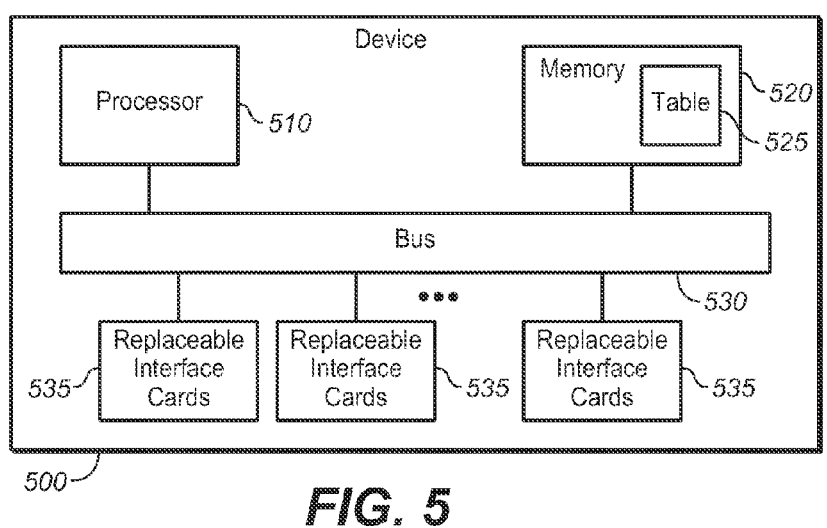
FIG. 5 is a block diagram illustrating an information handling device for performing system initialization in accordance with an embodiment of the present disclosure.

Referring generally to FIG. 4, a method for determining required software components in accordance with an exemplary embodiment of the present invention is shown. The method may be utilized as part of a computer system (e.g., device 500) initialization sequence. The method may also be implemented as part of a computer system which utilizes Small Computer System Interface (SCSI) for Input/Output processing. In a current embodiment of the present invention, the method 400 includes the step of loading a first managing software component and a resident portion of a first utilization software component for a first protocol for determining the format and transmission of data on a computer system 410. The resident portion of the first utilization software component may be included in a main loadable file (e.g., a boot file) which is always loaded upon system initialization.

In exemplary embodiments, the method 400 may further include the step of determining the availability of the first protocol by verifying the inclusion of the first managing software component for the first protocol 420. Verifying the inclusion of the first managing software component for the first protocol may include the first managing software component reporting its inclusion to a software component for determining which software components are required by the computer system. For example, the software component for determining which software components are required by the computer system may be the IONI software component. Reporting the inclusion of a software component to the IONI software component may utilize interfaces provided by the IONI software.

In exemplary embodiments, the method 400 may further include the step of loading a second managing software component and a resident portion of a second utilization software component for a second protocol for determining the format and transmission of data on a computer system 430. The resident portion of the second utilization software component may be included in a main loadable file (e.g., a boot file) which is always loaded upon system initialization.

In exemplary embodiments, the method 400 may further include the step of determining the availability of a second protocol by verifying the inclusion of the second managing software component for the second protocol 440. Verifying the inclusion of the second managing software component for the second protocol may include the second managing software component reporting its inclusion to a software component for determining which software components are required by the computer system. For example, the software component for determining which software components are required by the computer system may be the IONI software component.

In exemplary embodiments, the method 400 may further include the step of determining the availability of a second protocol by verifying the inclusion of the second managing software component for the second protocol 440. Determining the availability of a protocol may further include verifying hardware is installed in the computer system which implements the interface of the protocol. Verifying hardware is installed in the current computer system configuration which implements the interface of the protocol may be required for determining the availability of MTP-categorized protocols.

In exemplary embodiments, the method 400 may further include the step of identifying a usable protocol combination including at least the first protocol and the second protocol 450. Identifying a usable protocol combination including at least the first protocol and the second protocol may include verifying the first protocol and the second protocol are identified in a single usable protocol combination in a lookup table (e.g., table 525) of usable protocol combinations.

In exemplary embodiments, the method 400 may further include the step of loading an optional portion of the first utilization software component and an optional portion of the second utilization software component upon identification of the usable protocol combination including the first protocol and the second protocol 460.

Information handling device 500 may perform the method 400 according to an embodiment of the present disclosure. Information handling device 500 may contain processor 510 for loading loadable files (105, 120, and 140) of the present disclosure into memory 520. Processor 510 may load table 525 containing usable protocol combinations 205 into memory. Information handling device 500 may further contain replaceable interface cards 535. Replaceable interface cards 535 may utilize protocols. Information handling device 500 may be a computer system. Processor 510 may be communicatively coupled to memory 520 and replaceable interface cards 535 via bus 530.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:
1. A method, comprising:
    loading a first managing software component for a first data transmission protocol and a first portion of a first utilization software component for the first data transmission protocol on a computer system, wherein the first portion of the first utilization software component resides on a main loadable file;
    verifying the inclusion of the first managing software component for the first data transmission protocol;

loading a second managing software component for a second data transmission protocol and a first portion of a second utilization software component for the second data transmission protocol;

verifying the inclusion of the second managing software component for the second data transmission protocol;

loading a third managing software component for a third data transmission protocol and a first portion of a third utilization software component for the third data transmission protocol;

verifying the inclusion of the third managing software component for the third data transmission protocol;

identifying a usable protocol combination including at least the first data transmission protocol, the second data transmission protocol, and the third data transmission protocol; and loading a second portion of the first utilization software component, a second portion of the second utilization software component, and a second portion of the third utilization software component upon identifying the usable protocol combination including at least the first data transmission protocol, the second data transmission protocol, and the third data transmission protocol, wherein the second portion of the second utilization software component resides in an optional loadable file and wherein the second portion of the third utilization software component resides in another optional loadable file, wherein only optional loadable files containing optional portions corresponding to required protocols are loaded during initialization of the computer system.

2. The method of claim 1, wherein the computer system utilizes Small Computer System Interface (SCSI) for Input/Output processing.

3. The method of claim 1, wherein the verifying the inclusion of the first managing software component for the first data transmission protocol further includes:

verifying the inclusion of the first managing software component for the first data transmission protocol by the first managing software component for the first data transmission protocol reporting the first managing software component's inclusion to an Input/Output Network Interface (IONI) software component; and verifying hardware is installed in the computer system which implements the interface of the first data transmission protocol, wherein verifying the inclusion of the second managing software component for the second data transmission protocol further comprises:

verifying the inclusion of the second managing software component for the second data transmission protocol by the second managing software component for the second data transmission protocol reporting the second managing software component's inclusion to the IONI software component; and verifying hardware is installed in the computer system which implements the interface of the second data transmission protocol, and wherein verifying the inclusion of the third managing software component for the third data transmission protocol further comprises:

verifying the inclusion of the third managing software component for the third data transmission protocol by the third managing software component for the third data transmission protocol reporting the third managing software component's inclusion to the IONI software component; and verifying hardware is installed in the computer system which implements the interface of the third data transmission protocol.

4. The method of claim 1, wherein the computer system further includes a replaceable interface card utilizing at least one of the first data transmission protocol, the second data transmission protocol, and the third data transmission protocol.

5. The method of claim 1, wherein identifying a usable protocol combination including at least the first data transmission protocol, the second data transmission protocol, and the third data transmission protocol further includes:

identifying a usable protocol combination including at least the first data transmission protocol, the second data transmission protocol, and the third data transmission protocol by verifying that the first data transmission protocol, the second data transmission protocol, and the third data transmission protocol are a usable protocol combination which is listed in a lookup table of usable protocol combinations.

6. An information handling device, comprising:

a memory for storing information;

a processor, wherein the processor is configured for:

loading a first managing software component for a first data transmission protocol and a first portion of a first utilization software component for the first data transmission protocol on a computer system, wherein the first portion of the first utilization software component resides on a main loadable file;

verifying the inclusion of the first managing software component for the first data transmission protocol;

loading a second managing software component for a second data transmission protocol and a first portion of a second utilization software component for the second data transmission protocol;

verifying the inclusion of the second managing software component for the second data transmission protocol;

loading a third managing software component for a third data transmission protocol and a first portion of a third utilization software component for the third data transmission protocol;

verifying the inclusion of the third managing software component for the third data transmission protocol;

identifying a usable protocol combination including at least the first data transmission protocol, the second data transmission protocol, and the third data transmission protocol; and loading a second portion of the first utilization software component, a second portion of the second utilization software component, and a second portion of the third utilization software component upon identifying the usable protocol combination including at least the first data transmission protocol, the second data transmission protocol, and the third data transmission protocol, wherein the second portion of the second utilization software component resides in an optional loadable file and wherein the second portion of the third utilization software component resides in another optional loadable file;

wherein only optional loadable files containing optional portions corresponding to required protocols are loaded during initialization of the computer system; and a bus communicatively coupling the processor and the memory.

7. The device of claim 6, wherein the first data transmission protocol is a SCSI Transport Protocol (STP), the second data transmission protocol is an Intermediate Transport Protocol (ITP), and the third data transmission protocol is a Media Transport Protocol (MTP); and wherein the processor verifies the inclusion of a managing software component for a MTP protocol by the managing software component for the MTP protocol reporting the managing software component's for the MTP protocol inclusion to an Input/Output Network Interface (IONI) software component and verifying hardware is installed in the information handling device which implements the interface of the MTP protocol.

8. The device of claim 6, further including:
a replaceable interface card communicatively coupled via the bus to the processor and the memory, wherein the replaceable interface card utilizes at least one of the first data transmission protocol for determining the format and transmission of data, the second data transmission protocol for determining the format and transmission of data, and the third data transmission protocol for determining the format and transmission of data.

9. The device of claim 6,
wherein the processor being configured for verifying the inclusion of the first managing software component for the first data transmission protocol further includes the processor being configured for:
verifying the inclusion of the first managing software component for the first data transmission protocol by the first managing software component for the first data transmission protocol reporting the first managing software component's inclusion to an Input/Output Network Interface (IONI) software component; and
verifying hardware is installed in the computer system which implements the interface of the first data transmission protocol,
wherein the processor being configured for verifying the inclusion of the second managing software component for the second data transmission protocol further comprises:
verifying the inclusion of the second managing software component for the second data transmission protocol by the second managing software component for the second data transmission protocol reporting the second managing software component's inclusion to the IONI software component; and
verifying hardware is installed in the computer system which implements the interface of the second data transmission protocol, and
wherein the processor being configured for verifying the inclusion of the third managing software component for the third data transmission protocol further comprises:
verifying the inclusion of the third managing software component for the third data transmission protocol by the third managing software component for the third data transmission protocol reporting the third managing software component's inclusion to the IONI software component; and
verifying hardware is installed in the computer system which implements the interface of the third data transmission protocol.

10. The device of claim 6,
wherein the processor being configured for identifying a usable protocol combination including at least the first data transmission protocol, the second data transmission protocol, and the third data transmission protocol further includes the processor being configured for:
identifying a usable protocol combination including at least the first data transmission protocol, the second data transmission protocol, and the third data transmission protocol by verifying that the first data transmission protocol, the second data transmission protocol, and the third data transmission protocol are a usable protocol combination which is listed in a lookup table of usable protocol combinations.

11. The device of claim 6, wherein the device utilizes Small Computer System Interface (SCSI) for Input/Output processing.

12. A method for loading a main loadable file and a plurality of optional loadable files during initialization of a computer system, the method comprising:
loading the main loadable file, the main loadable file including a plurality of resident portions and an input/output network interface software component, each of the plurality of resident portions comprising a utilization software component configured to use at least one particular protocol;
reporting to the input/output network interface software component, by each of a plurality of manager software components configured to manage at least one particular protocol, protocols which each of the plurality of manager software components manage;
instantiating the input/output network interface software component upon reporting the protocols which each of the plurality of manager software components manage;
determining which protocols are available based upon the protocols reported by each of the plurality of manager software components and based upon hardware devices installed in the computer system;
identifying usable protocol combinations, each of the usable protocol combinations including a plurality of protocols;
determining, for each resident portion of the main loadable file, which protocols are required, wherein a particular protocol is determined to be required if the particular protocol is a part of one or more usable protocol combinations for which all of the protocols of the usable protocol combination are determined to be available;
identifying optional loadable files of the plurality of optional loadable files, wherein each identified optional loadable file contains a particular optional portion corresponding to a particular protocol determined to be required; and
during initialization of the computer system, loading each identified optional loadable file upon identifying the optional loadable files of the plurality of optional loadable files,
wherein only optional loadable files containing optional portions corresponding to required protocols are loaded during initialization of the computer system.

13. The method of claim 12, wherein identifying optional loadable files of the plurality of optional loadable files, wherein each identified optional loadable file contains a particular optional portion corresponding to a particular protocol determined to be required further comprises:
looking up an entry point for each optional portion of each identified optional loadable file.

14. The method of claim 13, further comprising:
executing the entry point for each optional portion of each identified optional loadable file upon loading each identified optional loadable file.

15. The method of claim 12, wherein identifying usable protocol combinations, each of the usable protocol combinations including a plurality of protocols further comprises:

identifying usable protocol combinations, each of the usable protocol combinations including a plurality of protocols, wherein at least one usable protocol combination includes one or more SCSI transport protocols, one or more intermediate transport protocols, and one or more media transport protocols.

16. The method of claim 15, wherein determining, for each resident portion of the main loadable file, which protocols are required, wherein a particular protocol is determined to be required if the particular protocol is a part of one or more usable protocol combinations for which all of the protocols of the usable protocol combination are determined to be available further comprises:

determining, for each resident portion of the main loadable file, which protocols are required, wherein a particular protocol is determined to be required if the particular protocol is a part of one or more usable protocol combinations for which all of the protocols of the usable protocol combination are determined to be available, wherein particular residents of the plurality of resident portions require a particular SCSI transport protocol, a particular intermediate transport protocol, and a particular media transport protocol, respectively.

17. The method of claim 16, wherein identifying optional loadable files of the plurality of optional loadable files, wherein each identified optional loadable file contains a particular optional portion corresponding to a particular protocol determined to be required further comprises:

identifying optional loadable files of the plurality of optional loadable files, wherein each identified optional loadable file contains a particular optional portion corresponding to a particular protocol determined to be required, wherein the particular optional portion of each optional loadable file corresponds to one of the particular SCSI transport protocol, the particular intermediate transport protocol, or the particular media transport protocol.

18. The method of claim 1, wherein the first data transmission protocol comprises a small computer system interface (SCSI) transport protocol, wherein the second data transmission protocol comprises an intermediate transport protocol, and wherein the third data transmission protocol comprises a media transport protocol.

19. The device of claim 6, wherein the first data transmission protocol comprises a small computer system interface (SCSI) transport protocol, wherein the second data transmission protocol comprises an intermediate transport protocol, and wherein the third data transmission protocol comprises a media transport protocol.

20. The method of claim 12, wherein the computer system utilizes Small Computer System Interface (SCSI) for Input/Output processing.

* * * * *